United States Patent [19]

Farthing

[11] Patent Number: 4,712,967
[45] Date of Patent: Dec. 15, 1987

[54] CAR CARRIER ASSEMBLY
[75] Inventor: Denis Farthing, Tampa, Fla.
[73] Assignee: Gulf Eastern Manufacturing Company, Tampa, Fla.
[21] Appl. No.: 675,079
[22] Filed: Nov. 26, 1984
[51] Int. Cl.$^4$ .............................................. B60P 3/12
[52] U.S. Cl. ................................... 414/563; 280/402
[58] Field of Search ......................... 414/563; 280/402

[56] References Cited

U.S. PATENT DOCUMENTS

| | | |
|---|---|---|
| 1,860,518 | 5/1932 | Wells . |
| 2,043,507 | 6/1936 | Culemeyer . |
| 2,639,926 | 5/1953 | Parks ............................ 414/563 X |
| 2,943,863 | 7/1960 | Corey et al. . |
| 2,971,769 | 2/1961 | Gaddis . |
| 3,066,946 | 12/1962 | Nelson . |
| 3,198,538 | 8/1965 | Nowell . |
| 3,963,129 | 6/1976 | Clayton ............................. 414/563 |
| 3,997,186 | 12/1976 | Pottorff ............................. 280/402 |
| 4,034,873 | 7/1977 | Haring ............................. 414/563 |
| 4,155,678 | 5/1979 | Lehman et al. . |
| 4,186,938 | 2/1980 | Youngblood ................... 414/563 X |
| 4,434,993 | 3/1984 | Curtis ............................. 414/563 X |

FOREIGN PATENT DOCUMENTS 2334580 1/1975 Fed. Rep. of Germany ...... 280/402
 878621 11/1981 U.S.S.R. ............................. 280/402

OTHER PUBLICATIONS

Brochure-Landoll Centerfold Truck-Landoll Corp.
Brochure-Pop-Up Dolly-Tollemanufacturing Co.
Article-Wheel Lift Combo Unit-Century Wrecking Corp.
Advertisement-The Hy-Jacker by Merlin.
Brochure-Wrangler-Jerr-Dan Corp.
Brochure-The Eagle Wheel Lift-American Wheelift Systems.
Brochure-Chevron-Chevron Co.
Brochure-Peterson Sloop-Diversified Products Mfg. Co.

Primary Examiner—Robert J. Spar
Assistant Examiner—Stuart J. Millman
Attorney, Agent, or Firm—Dominik, Stein, Saccocio & Reese

[57] ABSTRACT

A car carrier assembly designed to be used in conjunction with a conventional tow dolly allowing a disabled vehicle to be towed by a conventional tow wrecker having a tow sling. The car carrier assembly comprises a pair of longitudinal side members configured in a spaced apart manner by a tow bar connected to the forward ends of the side members by a pair of angled members. The rearward ends of the side members are detachably connected to the tow dolly. The rearward wheels of the vehicle are supported from the ground by the tow dolly and the forward wheels of the vehicle are supported from the ground by extensible wheel tubes extending between the side members of the car carrier assembly when the tow sling of the wrecker engages and elevates the tow bar of the assembly.

18 Claims, 4 Drawing Figures

U.S. Patent  Dec. 15, 1987  Sheet 1 of 1  4,712,967
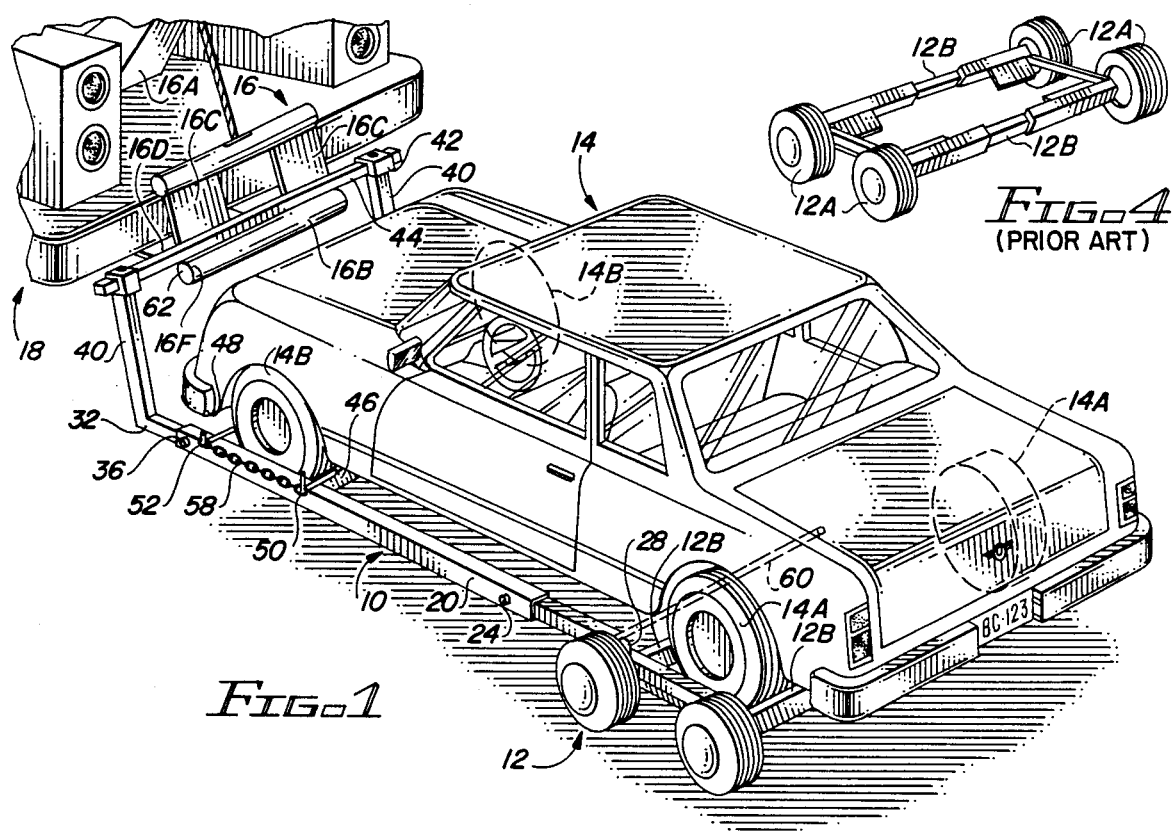
Fig. 1
Fig. 4 (PRIOR ART)
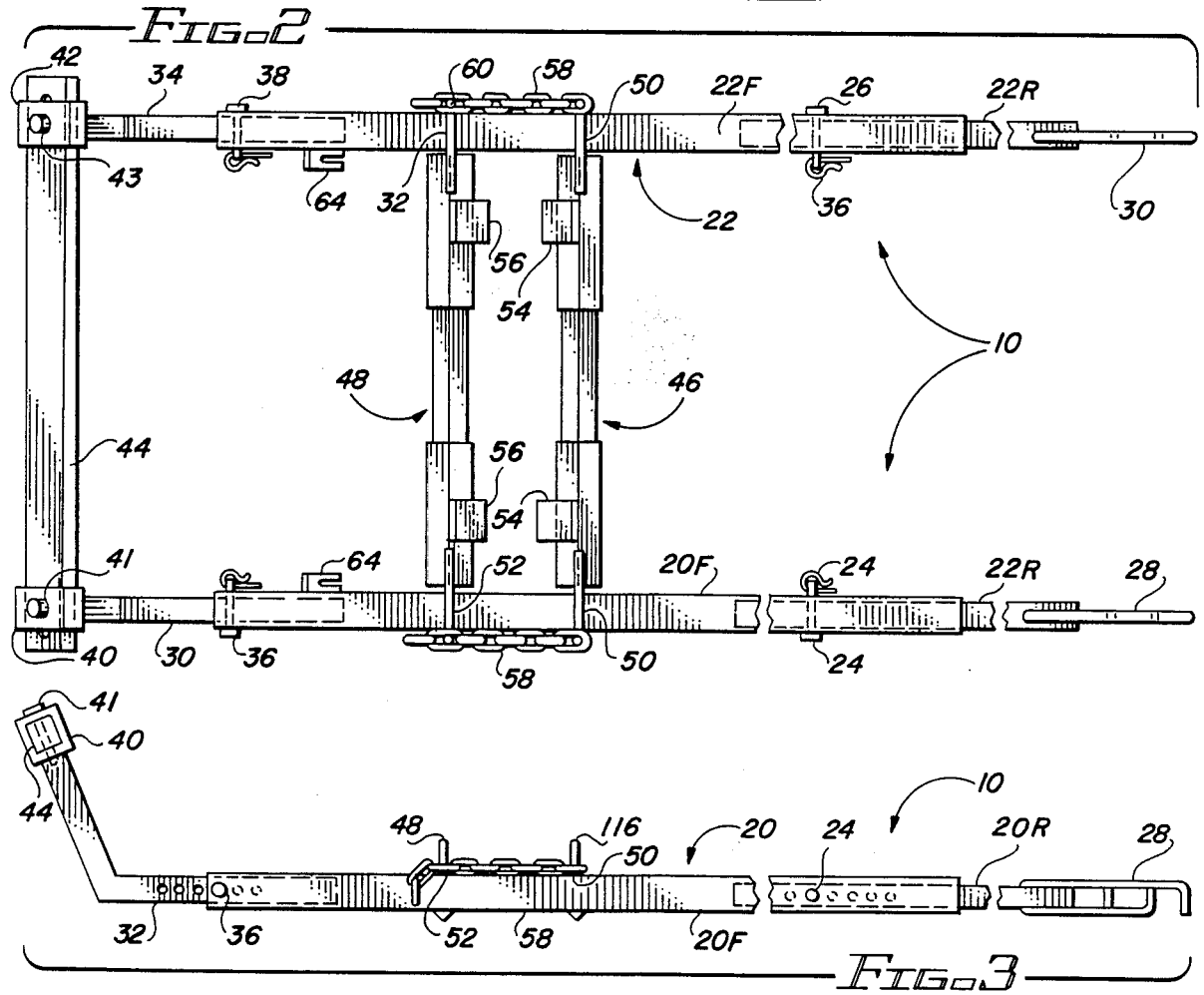
Fig. 2
Fig. 3

CAR CARRIER ASSEMBLY

BACKGROUND OF THE INVENTION

1. Field of the Invention

This invention relates to devices for towing disabled vehicles. More particularly, this invention relates to carrier assemblies designed to transport a disabled vehicle by means of a wrecker having a tow-sling.

2. Description of the Background Art

Since the development of automatic vehicular transmissions, it has been recognized that the towing of a disabled vehicle with its rear wheels contacting the roadway will cause great damage to the automatic transmission; hence, it has been long recognized that a disabled vehicle, having an automatic transmission, must be towed from the rear with only the front wheels contacting the road surface. However, unless the steering was locked with a steering wheel lock mechanism, it was soon realized that rearward towing was sometimes hazardous because of the possible swaying of the vehicle under two caused by the ability of the front wheels to turn during towing.

Many devices have been invented in response to the need for safe forward towing of a vehicle. Basically, these devices have consisted of a four-wheeled dolly designed to be positioned under the rear wheels of the vehicle so that the rear wheels of the vehicle do not contact the ground during towing. Probably the most prominent dolly presently being used in the industry is the type which is fitted about the rear wheels of the vehicle and then pivoted to a pop-up position to fully lift the rear wheels of the vehicle off the ground. Another popular version of the dollies requires that the vehicles be jacked up so that the rear wheels are off the road's surface and then the wheels of the dolly are installed thereunder. After the vehicle has been positioned on the dolly, the tow-sling of the wrecker engages the front end of the vehicle, and the vehicle is towed.

These towing dollies have been universally adopted throughout the industry. They have permitted a wrecker, manned by only one person, to quickly and easily tow a disabled vehicle without the rear wheels of the vehicle contacting the roadway, thereby eliminating any damage to the automatic transmission thereof. Moreover, with a dolly positioned under the front wheels of the vehicle, the vehicle may be towed rearwardly with great stability and virtually no swaying. The Information Disclosure Statement, filed concurrently herewith, illustrates the many types of dollies which presently exist.

Unfortunately, one major limitation to all of the aforementioned dollies is the requirement that the tow-sling of the wrecker be able to engage and lift the front end of the vehicle so that the front wheels of the vehicle do not engage the road surface during the tow. Likewise, with rearward towing, the tow-sling of the wrecker must be able to engage and lift the rear end of the vehicle so that the rear wheels of the vehicle do not engage the ground. Historically, the design of the vehicles themselves has provided adequate clearance for such engagement of the tow-sling to either the front or the rear end of the vehicle. However, in recent years with the proliferation of smaller sized vehicles, particularly sports cars, it has become impossible to lift the front or rear end of such vehicles without damage to the cosmetic panels affixed to the front or rear undercarriage of the vehicle.

While the aforementioned disadvantage to the dolly is prevalent throughout the industry, the only device known to me which allows a vehicle to be towed by a wrecker is a hydraulically operated scoop mechanism. Basically, this type of scoop mechanism consists of two wheel-receiving frameworks which are positioned at the end of a hydraulically pivotable arm affixed to the rear of the wrecker. During use, the two wheel-receiving frameworks are forced under the wheels of the vehicle, and then the hydraulic cylinder is operated to forcibly lift the vehicle off the ground. While this scoop device does permit the proper towing of a vehicle, it should be appreciated that the extended length of the arm of the device creates a large moment which exerts an excessive force on the rear of the wrecker. Consequently, this scoop device can only be used on the larger wreckers as opposed to conventional pickup trucks having a tow-sling adapted to the bed thereof. Because of this severe limitation, this scoop device has not been widely accepted throughout the industry.

The only other method for transporting the smaller sized automobiles, such as sports cars, known to me consists of a large, flatbed truck in which the bed of the truck slides rearwardly and then pivots downwardly to allow the vehicle to be moved thereon. The bed of the truck is then forced back on the undercarriage of the truck. Obviously, these car carrier systems are extremely expensive because of the necessity for purchasing another truck and a complex, slidable and pivoting bed mechanism. Several types of these trucks are illustrated in the references listed on said Information Disclosure Statement.

Therefore, it is an object of this invention to provide an apparatus which overcomes the aforementioned inadequacies of the prior art devices and provides an improvement which is a significant contribution to the advancement of the vehicle carrier assembly art.

Another object of this invention is to provide a car carrier assembly which can be utilized in conjunction with a tow-sling of a conventional wrecker to tow a disabled vehicle with the vehicle's wheels completely elevated.

Another object of this invention is to provide a car carrier assembly for use in conjunction with a conventional dolly to tow a vehicle, either rearwardly or forwardly, by a tow sling of a wrecker without any modification to the wrecker itself, the wrecker's tow sling, or the dolly.

Another object of this invention is to provide a car carrier assembly for use in conjunction with a conventional dolly in which the vehicle being towed is completely supported only by the wheels of the vehicle, thereby precluding damage to any other part of the vehicle.

Another object of this invention is to provide a car carrier assembly which is capable of being easily disassembled for convenient storage in the bed of the wrecker.

Another object of this invention is to provide a car carrier assembly which can be installed about the disabled vehicle with as little as two feet of clearance at the sides of the vehicle.

Another object of this invention is to provide a car carrier assembly which is adjustable to be used to tow virtually any vehicle, irrespective of the wheel base of the vehicle, the width of the vehicle, or the width of the wheels themselves.

Another object of this invention is to provide a car carrier assembly which balances the weight of the vehicle to allow the assembly to be used in conjunction with lighter tow trucks.

Another object of this invention is to provide a car carrier assembly which can be quickly installed by one wrecker operator.

Another object of this invention is to provide a car carrier assembly which is economical to manufacture.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises a car carrier assembly designed to be used in conjunction with a conventional tow dolly to completely lift the disabled vehicle from the roadway during towing. More particularly, the car carrier assembly of the invention comprises a pair of longitudinal side members designed to be positioned along the opposing longitudinal sides of the vehicle. An upwardly extending transverse tow bar is operatively connected to the front ends of the side bars by means of a pair of angled members. The rear ends of the side members each include a hook designed to hook over one of the cross-members of the dolly. A pair of telescopic wheel tubes are provided to connect to the side members in alignment with the rear (or front) wheels of the vehicle.

During use, the dolly is positioned about the rear wheels of the vehicle in the conventional manner. The side members of the car carrier assembly of the invention are positioned on opposing sides of the vehicle and the rear ends thereof are hooked over the cross-member of the dolly. The angled members are affixed to the front ends of the side members and locked into place by means of a pair of pins. The tow bar is then installed between the angled members and also secured in place by means of similar pins. The wheel tubes are positioned about the wheels and secured in place by means of a pair of chains.

The conventional dolly is erected in the conventional manner to lift the rear of the disabled vehicle. The tow-sling of the wrecker is then moved into position beneath the tow bar of the assembly and operated to completely lift the assembly and, hence, the vehicle.

It should be appreciated that the car carrier assembly of the invention operates in conjunction with the dolly as a cradle to completely lift the vehicle without any contact with any part of the vehicle itself except for its wheels. Consequently, damage to the cosmetic panels of the vehicle is absolutely precluded. It should also be appreciated that the car carrier assembly of the invention may be disassembled to a "knocked-down" condition and conveniently stored on the bed of a conventional tow truck. Further, the design of the car carrier assembly which disperses the weight of the vehicle being towed about its length allows a lighter tow truck to be used to accomplish the towing. Finally, the car carrier assembly of the invention may be quickly and easily installed about a disabled vehicle even when the vehicle is situated in close quarters adjacent to other vehicles or structures.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1 is a perspective view of the car carrier assembly of the invention in use in conjunction with a conventional dolly in which a vehicle is towed by a tow-sling of a wrecker;

FIG. 2 is a top plan view of the car carrier assembly of the invention illustrating a pair of side members connected by the adjustable tow bar and the adjustable wheel tubes;

FIG. 3 is a left side view of the car carrier assembly of the invention illustrating adjustable the left angled member and illustrating the manner in which the wheel tubes are secured together and FIG. 4 is a perspective view of the conventional dolly.

Similar reference characters refer to similar parts throughout the several views of the drawings.

DETAILED DESCRIPTION OF THE PREFERRED EMBODIMENT

FIG. 1 is a perspective view of the car carrier assembly 10 of the invention used in conjunction with a conventional dolly, generally indicated by the numeral 12, for towing a four-wheeled vehicle 14 by means of a conventional tow-sling 16 of a wrecker 18. While the assembly 10 may be used in conjunction with virtually any type of dolly 12, the most prevalent type of dolly 12 comprises two pairs of wheels 12A which are interconnected by means of a pair of wheel tubes 12B on which the rear wheels 14A of the vehicle 14 rest during use (see FIG. 4). Likewise, while many tow-slings 16 may suffice, conventional tow-slings comprise a boom 16A from which a tow cross-member 16B is suspended by means of a pair of slings 16C. The tow cross-member 16B is then rigidly connected to the lower end, or bumper, of the wrecker 18 by means of a pivotable triangular support 16D.

FIGS. 2 and 3 illustrate the various components of the car carrier assembly 10 of the invention and the manner in which the components interconnect with one another during assembly. More specifically, the car carrier assembly 10 comprises a pair of telescopic, longitudinal side members 20 and 22. Each of the side members 20 and 22 are preferably manufactured from rectangular tube stock dimensioned so that the rearward component of the side members 20R and 22R telescope into the forward component 20F and 22F. The side members 20 and 22 are adjustably telescopic by means of a plurality of holes positioned through the rearward component 20R and 22R which are adjustably aligned with a similar hole through the wall of the forward component 20F and 22F. A pair of pins 24 and 26 are provided to removably engage through the holes in the rear and forward components 20 and 22 to rigidly secure the two components together.

A pair of hooks 28 and 30 are rigidly connected to the rearward ends of the rear components 20R and 22R of the side members 20 and 22, respectively. The hooks 28 and 30 are dimensioned and configured to engage over the forward most wheel tube 12B of the dolly 12 and be retained thereby.

A pair of angled members 32 and 34 are provided to telescope into the respective side members 20 and 22. More specifically, the angled members 32 and 34 are preferably manufactured from rectangular tube stock and dimensioned to slidably engage into the forward most end of side members 20 and 22. A plurality of holes are positioned through the angled members 32 and 34 in alignment with a corresponding hole through the forward most end of the side members 20 and 22. A pair of pins 36 and 38 are provided to removably engage through the holes in the respective side members 20 and 22 to allow longitudinal adjustment of the angled members 32 and 34.

The uppermost end of each of the angled members 32 and 34 include a slip collar 40 and 42 configured and dimensioned to slidably receive the respective ends of a tow bar 44. Preferably, the tow bar 44 is manufactured from rectangular tube stock and, likewise, the collars 40 and 42 are preferably rectangular in cross-section to slidably receive the ends of the tow bar 44. The ends of the tow bar 44 include a plurality of holes which are aligned with a corresponding hole positioned in each of the collars 40 and 42. A pair of lock pins 41 and 43 are provided to removably engage through the hole in the respective collars 40 and 42 and the aligned hole in the end of the tow bar 44 to rigidly secure the tow bar 44 to the collars 40 and 42. The lock pins 41 and 43 allow adjustment of the width of the assembly to accommodate vehicles with oversized wheels 14B.

A pair of telescopic wheel tubes 46 and 48 are provided to extend across from one side member 20 or 22 to the other in a position in alignment with the front wheels 14A of the vehicle 14. Each of the wheel tubes 46 and 48 are preferably manufactured from rectangular tube stock and have three components: a center component which telescopes into the side components. Hooks 50 and 52 are rigidly connected to the end of each of the respective wheel tubes 46 and 48 by welding or the like. The hooks 50 and 52 are configured and dimensioned to hook over the respective side members 20 and 22 and be adjustable along the length thereof to accommodate vehicles 14 having different sized wheel bases. Each of the wheel tubes 46 and 48 further comprise wheel supports 54 and 56 designed to function as a seat for the wheels 14B of the vehicle 14. Finally, a short length of chain 58 is rigidly connected to the ends of the rearward wheel tube 46. As illustrated, the chain 58 is preferably permanently welded to the hook 50 of the rearward wheel tube 46. A grab hook 60 is likewise welded to the frontmost wheel tube 48 to adjustably engage the lengths of chain 58.

During use, the pair of wheel tubes 12B of the conventional dolly 12 is positioned about the rear wheels 14A of the vehicle 14 according to the instructions of the manufacturer of the dolly 12. The side members 20 and 22 of the car carrier assembly 10 of the invention are positioned on opposing sides of the vehicle 14. The components of the side members 20 and 22 are telescoped inwardly or outwardly to approximate the length of the vehicle. Pins 24 and 26 are then fitted through the respective holes in the side members 20 and 22 to rigidly secure the two components thereof together.

The angled members 30 and 32 are respectively fitted into the front ends of the side members 20 and 22 and telescopically adjusted so that the uppermost end thereof is appreciably away from the grillwork of the vehicle 14. Pins 36 and 38 are then installed to rigidly secure the angled members 32 and 34 to the respective side members 20 and 22. The ends of the tow bar 44 are fitted into the respective collars 40 and 42 are secured into place by means of pins 41 and 43.

The wheel tubes 46 and 48 are positioned beneath the vehicle 14 substantially parallel to the axle of the front wheels 14B. The hooks 50 and 52 of wheel tubes 46 and 48 are positioned over the respective side members 20 and 22. On each side of the vehicle 14, the ends of the wheel tubes 46 and 48 are pulled together to tightly encompass the front wheels 14B of the vehicle 14. The chain 58 is then grabbed by means of the grab hook 60 to rigidly secure the wheel tubes 46 and 48 about the front wheels 14B.

After the dolly 12 has been erected via crank arm 60 to elevate the rear wheels 14A of the vehicle 14, the wrecker 18 is moved into position such that its tow-sling 16 is positioned under the tow bar 44 of the assembly 10. The tow-sling 16 is connected to the assembly 10 by means of a pair of chains 62 which interconnect a grab hook 64 welded to each of the side members 20 and 22 of the assembly 10 and to a similar grab hook 16F welded to the tow cross-member 16B of the tow-sling 16. The tow-sling 16 is then operated to engage the tow bar 44 of the assembly 10 and lift the assembly 10 so that the vehicle 14 may be towed. After towing, the assembly 10 is disassembled in the reverse order specified above and, with the components of the side members 20 and 22 fully telescoped inwardly, is conveniently stored on the bed of the tow truck 18.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit of the invention.

Now that the invention has been described,
What is claimed is:

1. A car carrier assembly for use in conjunction with a dolly having a means for allowing elevation of the rearward pair of wheels of a four-wheeled vehicle for towing by a lifting mechanism of a wrecker, the car carrier assembly comprising in combination:

a left and a right side member for positioning in a spaced apart manner on opposing sides of the vehicle, each said side member including a rear end and an upwardly angled front end;

a tow bar;

means for removably connecting said tow bar to said front ends of said side members for engagement by the lifting mechanism of the wrecker;

means for removably connecting said rear ends of said side members to the dolly to support said rear ends of said side members in an elevated position;

wheel engaging means for engaging the forward wheels of the vehicle; and means for removably connecting said wheel engaging means between said side members to cause elevation of the forward portion of the vehicle upon elevation of said tow bar.

2. The assembly as set forth in claim 1, wherein said means for removably connecting said tow bar to said front ends of said side members further comprises means for adjustably connecting said tow bar to said front ends of said side members to adjustably increase or decrease the width of the assembly.

3. The assembly as set forth in claim 1, wherein said side members are extensible.

4. The assembly as set forth in claim 3, wherein said side members comprise two components which telescope relative to one another.

5. The assembly as set forth in claim 1, wherein said means for connecting said rear ends of said side members to the dolly comprises a hook.

6. The assembly as set forth in claim 1, wherein said wheel engaging means comprises a pair of extensible wheel members extending transversely between said side members in a spaced apart relationship and wherein said means for removably connecting said wheel engaging means between said side members comprises means for removably connecting said wheel members to the respective said side members.

7. The assembly as set forth in claim 6, wherein said wheel members comprise two components which telescope relative to one another.

8. The assembly as set forth in claim 7, wherein said means for removably connecting said wheel members to the respective said side members comprises means for adjustably connecting said wheel members to the respective said side members.

9. The assembly as set forth in claim 8, wherein said means for adjustably connecting said wheel members to the respective said side members comprises a hook which engages over the respective said side members.

10. The assembly as set forth in claim 9, further including means for rigidly securing said wheel members relative to one another from further outward separation from said spaced apart relationship.

11. A vehicle transport assembly for towing of a four-wheeled vehicle by a lifting mechanism of a wrecker having a tow sling, the vehicle transport assembly comprising in combination:

a tow dolly for supporting in an elevated position the rearward pair of wheels of the wheeled vehicle comprising a pair of wheels, a transverse member interconnecting said wheels for supporting said rearward wheels of the vehicle, and means for allowing elevation of said transverse member supporting the rearward wheels of the vehicle to support in an elevated position the rearward portion of the vehicle; and a vehicle carrier assembly comprising, a left and a right side member for positioning in a spaced apart manner on opposing sides of the vehicle, each said side member including a rear end and an upwardly angled front end;

a tow bar;

means for removably connecting said tow bar to said front ends of said side members for engagement by the tow sling of the wrecker;

means for removably connecting said rear ends of said side members to said transverse member of said tow dolly to support said rear ends of said side members in an elevated position;

wheel engaging means for engaging the forward wheels of the vehicle; and means for removably connecting said wheel engaging means between said side members to cause elevation of the forward portion of the vehicle upon elevation of said tow bar.

12. The assembly as set forth in claim 11, wherein said means for removably connecting said tow bar to said front ends of said side members further comprises means for adjustably connecting said tow bar to said front ends of said side members to adjustably increase or decrease the width of the assembly.

13. The assembly as set forth in claim 11, wherein said side members are extensible.

14. The assembly as set forth in claim 11, wherein said wheel engaging means comprises a pair of extensible wheel members extending transversely between said side members in a spaced apart relationship and wherein said means for removably connecting said wheel engaging means between said side members comprises means for removably connecting said wheel members to the respective said side members.

15. The assembly as set forth in claim 14, wherein said means for removably connecting said wheel members to the respective said side members comprises means for adjustably connecting said wheel members to the respective said side members.

16. A vehicle assembly for towing a four-wheeled vehicle by a lifting mechanism of a wrecker having a tow sling in combination with a tow dolly having a pair of wheels interconnected in a spaced apart relationship by a transverse member for supporting the rearward pair of wheels of the vehicle and having means for allowing elevation of the rearward wheels of the vehicle to support in an elevated position the rearward portion of the vehicle, the vehicle assembly comprising in combination:

a left and a right extensible side member for positioning on opposing sides of the vehicle, each said side member including a rear end and a front end;

means for removably connecting said rear ends of said side members to the transverse member of the tow dolly;

a left and a right angle member each having a forward end and a rearward end;

means for connecting said rearward ends of said angle members to said front ends of said side members such that said forward ends are angled upwardly;

a tow bar for engagement by the tow sling of the wrecker;

means for connecting said tow bar to said forward ends of said angle members to secure said angle members and correspondingly, said front ends of said side members in a spaced apart relationship;

wheel engaging means for engaging the forward wheels of the vehicle, said wheel engaging means comprising an extensible wheel member extending from one said side member to the other and seat means for engaging under the forward wheels of the vehicle; and means for removably connecting said wheel member to said side members to cause elevation of the forward portion of the vehicle upon elevation of said tow bar.

17. The assembly as set forth in claim 16, wherein said means for connecting said rear ends of said side member to the transverse member of the tow dolly comprises hook means affixed to said rear ends of said members which engages over, the transverse member.

18. The assembly as set forth in claim 16, wherein said means for removably connecting said wheel member to said side members comprises hook means affixed to said wheel member which engages over said side members, respectively.

* * * * *